July 10, 1945.  C. E. PATTON  2,380,068
OIL SEAL PULLER
Filed Dec. 8, 1943
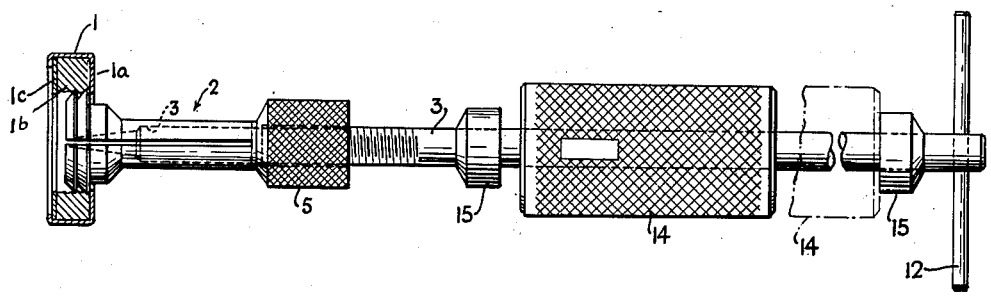
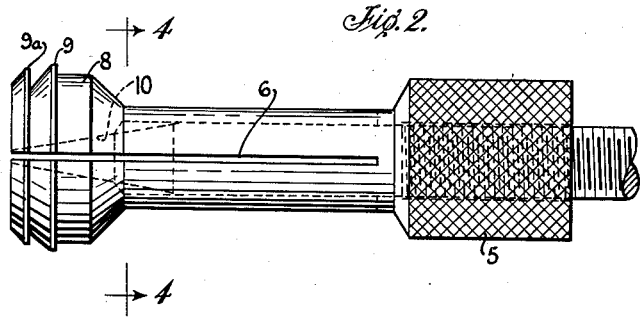
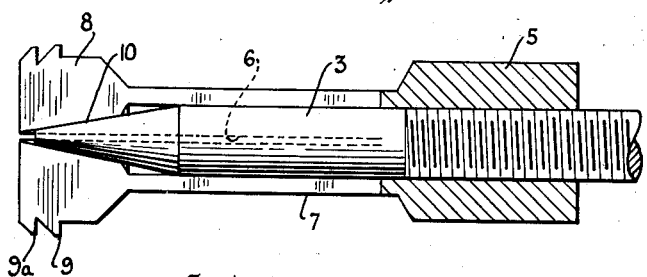
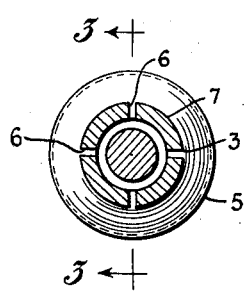
Inventor
CLARK E. PATTON
By
Attorneys Patented July 10, 1945

2,380,068

UNITED STATES PATENT OFFICE 2,380,068

OIL SEAL PULLER

Clark E. Patton, Springfield, Ohio

Application December 8, 1943, Serial No. 513,649

1 Claim. (Cl. 29—255)

The present invention is for an improvement in tools which are utilized primarily for extracting oil-sealing rings from bearings or the like. It has become quite common to employ metal rings or gaskets for sealing oil within casings or bearings. It is the object of the invention to devise a tool which may be employed to remove sealing rings quickly and easily and without injury to the seals even if they have become firmly fixed in their seats.

The type of tool shown herein is especially adapted for the most difficult operation, it being the object of the invention to provide a strong, simple and effective tool of few parts.

In the drawing there is shown the best known and preferred embodiment of the invention, it being understood that the invention is not necessarily limited to the exact details shown and described, as modifications and alterations may be made in the design without departing from the invention as set forth in the appended claim.

In the drawing:

Fig. 1 is a side elevation of a tool embodying the invention, a part of the stem or shaft being broken away to conserve space on the drawing. A typical oil seal is shown on the tool.

Fig. 2 is an enlarged view of the expanding chuck or grip by which the oil seal is engaged.

Fig. 3 is a longitudinal section thereof.

Fig. 4 is a cross-section on the line 4—4 of Fig. 2.

An oil seal, which is shown at 1, consists of a flanged metal disk $1^a$ forming a recess in which is seated a packing material $1^b$ held in place by a ring $1^c$. The inner surface of the disk $1^a$ affords a means by which the oil seal may be gripped and pulled out of its place.

The tool consists of a one piece expansible chuck or grip indicated by the numeral 2 and a combined shaft and expanding member 3. As shown, the chuck consists of a relatively heavy sleeve one end 5 of which constitutes a body portion which is solid and provided with a screw threaded bore. The balance of the chuck is divided by a number of cuts 6 extending from the body portion to the head. As shown, these cuts are four in number to provide a plurality of integral spring arms, and as the chuck is made of a spring steel, these arms may be spread apart to engage and hold the oil seal. For this purpose the head 8 of the chuck is enlarged and provided with circumferential ribs 9 and $9^a$ of different diameters so as to accommodate a variety of sizes of oil seals. When the chuck is in normal or unexpanded condition, the head may be inserted in the center of the oil seal so that one of the ribs lies behind the disk $1^a$. On expansion the circumference of the rib 9 (or $9^a$) exceeds the aperture in the disk $1^a$ so that the oil seal is firmly gripped. This condition is shown in Fig. 1.

The shaft 3 is threaded into the body portion 5 and at its inner end extends into the expanding head where it is tapered or coned to fit the corresponding cone-shaped surfaces 10 on the interior of the expanding arms. By rotating the shaft within the grip, the head may be expanded or contracted. A handle 12 may be provided on the end of the shaft to facilitate its rotation.

To assist in freeing the oil seal after it has been firmly gripped by the expansion of the chuck, the body of the shaft above the chuck carries a freely sliding block 14 which is sufficiently heavy to act as an effective hammer, the extent of movement of the hammer being limited by the two collars 15—15 welded to the shaft.

In operation, the shaft is retracted in the chuck so as to permit the expanding arms of the chuck to assume their normal position, in which condition the head of the chuck is small enough to be inserted in the seal. The shaft and the chuck are now rotated relatively, forcing the tapered end of the shaft inwardly and expanding the arms until the rib on the head of the tool interlocks with the seal as shown in Fig. 1. If the seal is firmly held in its seat, the operator strikes the hammer against the stop 15 to the right as shown in Fig. 1 until the oil seal is sufficiently loosened to be lifted out by the tool. As the expanding arms and the body are in one piece, the operator may strike heavy and repeated blows on the shaft without danger of breaking the tool. The abutment 15 to the left prevents the hammer from striking the operator's hand which may be grasping the sleeve 5. It also may be used to drive the bearing ring back into place.

The tool is very simple and rugged so that it cannot get out of order. It is an extremely effective device for the purposes set forth and has many advantages over other types of tools for this purpose. While the invention is illustrated as an oil seal puller, with appropriate modifications it may be adapted for a wide variety of uses.

What is claimed is:

An extractor consisting of a sleeve having an interiorly screw threaded portion at one end, an intermediate reduced portion and an enlarged head, the head and the intermediate portion of the sleeve being provided with longitudinal slots to form integral spring arms, the head portion of the sleeve having an exterior gripping formation and an interior tapered surface, an integral shaft extending from the head to a point substantially beyond the other end of the sleeve, that end of the shaft which is located within the head being provided with a conical end in contact with the aforesaid tapered surfaces, an intermediate portion of the shaft being provided with a thread engaging the threaded portion of the sleeve, that portion of the shaft which extends beyond the sleeve being unthreaded, spaced abutments secured on the remote end of the shaft, a sliding block between the abutments on the unthreaded portion of the shaft, and means to rotate the shaft in the sleeve to move the conical end of the shaft toward or from the tapered surfaces.

CLARK E. PATTON.